(No Model.)
C. K. HUGUET.
SYSTEM OF ELECTRICAL DISTRIBUTION.
No. 541,233. Patented June 18, 1895.
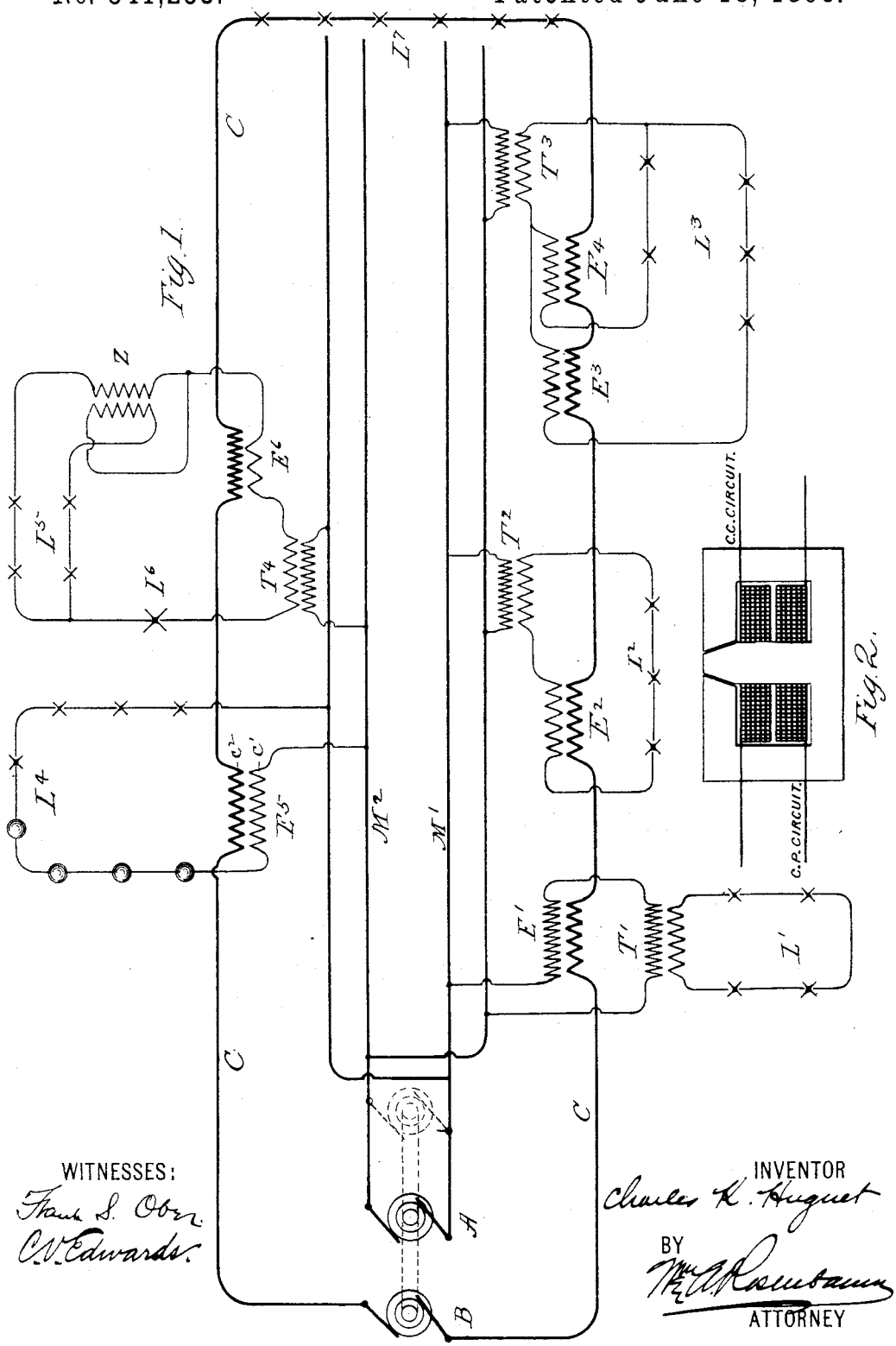
WITNESSES:
Frank S. Ober
C. V. Edwards
INVENTOR
Charles K. Huguet
BY
[signature]
ATTORNEY

UNITED STATES PATENT OFFICE.

CHARLES K. HUGUET, OF NEW ORLEANS, LOUISIANA.

SYSTEM OF ELECTRICAL DISTRIBUTION.

SPECIFICATION forming part of Letters Patent No. 541,233, dated June 18, 1895.

Application filed January 30, 1895. Serial No. 536,620. (No model.)

*To all whom it may concern:*

Be it known that I, CHARLES K. HUGUET, a citizen of the United States, residing at New Orleans, in the parish of Orleans and State of Louisiana, have invented certain new and useful Improvements in Systems of Electrical Distribution, of which the following is a full, clear, and exact description.

This invention relates to systems of distribution of alternating electric currents for the purpose of supplying light or power.

The object of this invention is to supply to each of one or more different branch circuits an alternating current of constant strength, from a source of alternating currents of constant potential.

The invention comprehends the use of a plurality of dynamo machines or other sources of alternating electric currents, part of which are arranged by any known method to furnish currents of constant pressure or potential, and the others to furnish currents of constant strength or volume, all the machines being arranged by any known method to run in synchronism, but with a difference of phase of exactly one-half period between the impressed electro-motive forces of the constant volume and constant potential currents. This relation is what is technically known as running in antiphase.

The invention further comprehends the use of transformers or converters, one coil of each transformer being connected in the constant current circuit, and the other coil of each transformer being connected in a branch circuit from the constant potential circuit, containing also lamps or other translating devices, or else the second coil of the transformer is in the secondary circuit of still another transformer, the primary of which is actuated by a current in a branch circuit from the constant potential dynamo.

The invention will be specifically described with reference to the accompanying drawings, in which—

Figure 1 is a conventional plan of apparatus and circuits illustrating my invention, and Fig. 2 is a sectional view of a form of transformer or inductive apparatus utilized in carrying out my invention.

A is an alternating current dynamo so adjusted or regulated by any method known in the art as to furnish a current of practically constant electro-motive force, difference of potential or pressure, and of a volume or strength according to the demand made upon it, ranging from nothing up to the greatest amount which it is capable of furnishing.

B is an alternating current dynamo adjusted or regulated by any known method to furnish a current of constant strength or volume, and of a difference of potential or pressure according to the demand, up to its full capacity. These two dynamo machines are kept in synchronism and antiphase by mechanical connection or by any other known method.

$E'$, $E^2$, $E^3$, $E^4$, $E^5$ and $E^6$ are transformers, one coil of each of which is connected in the circuit C C coming from the constant current dynamo B, and the other coil of each of which is connected in a branch circuit from the mains $M'$ $M^2$ from the constant potential dynamo, or in the secondary circuit of another auxiliary transformer, the primary of which is in a branch from the mains $M'$ $M^2$. $T^2$, $T^3$ and $T^4$ are such auxiliary transformers.

$L'$, $L^2$, $L^3$, $L^4$, $L^5$, $L^6$ and $L^7$ are lamps or other translating devices in the various circuits.

Z is another auxiliary transformer used in still a different manner to be presently described.

The operation of this apparatus is as follows: In the transformer $E^5$ and lamp circuit $L^4$, which is the simplest case shown, the lamps are supplied directly from the constant potential circuit and so long as the total impedance of this circuit remains constant the lamps will consume a constant volume of current without any assistance or regulation from the transformer $E^5$. If however from any cause whatever the impedance varies, the volume of current would also vary were it not for the regulating action of the transformer $E^5$, which action however practically prevents such a change. To completely explain this regulation it is necessary to discuss the theory of the transformer to some extent. It is well known that the magnetizing effect of a current in a coil is proportional to its ampère turns, that is, the product of its strength in ampères, by the number of turns or convolutions in the coil through which the current passes. It is also well known that the magnetism produced in a coil by an alternating current creates a counter or back electro-motive-force which opposes the current that produced it. It is therefore evident that if the second coil of the transformer carries a current of opposite phase, (that is always tending to magnetize the core in the opposite direction from the first current,) each current will hinder itself and help the other. It is further evident that if both coils have the same number of ampère turns, each current will be helped by the other in the same degree as it hinders itself, so that the core will remain unmagnetized, and each circuit will be as though it were independent of the other and no transformer in the circuit. This is the condition which we will first assume to exist in circuits $L^4$ and C C. In this condition the normal current is flowing through the circuit $L^4$, and the circuit $L^4$ has its normal impedance, which is of such a numerical value that when multiplied by the strength of current the product is equal to the electro-motive force of the constant potential dynamo A. This impedance however is subject to variation. If the circuit contains lamps or other non-inductive resistances, the resistances may vary, or if the circuit contains electro-magnetic devices a change of relative position of their parts may cause a change in their mutual induction and consequently in the impedance of the whole circuit. Suppose the impedance of $L^4$ decreases. The immediate tendency is for the current in $L^4$ to increase. The first little increment of current however disturbs the balance in $E^5$ and the core becomes somewhat magnetized by the excess of ampère turns in $c'$. This tends to choke the current in $L^4$ and to help the current in C C. If the dynamo B had no current regulation, the current in C C would increase until the core of $E^5$ was again demagnetized, but it is an essential part of this invention that B should regulate for constant current as before stated, so that the electro-motive-force of B drops sufficiently to maintain the current in C C constant, and the condition of an opposing electro-motive force in $c'$, and an assisting electro-motive force in $c^2$ is permanent. Therefore the surplus energy of the circuit $L^4$ which would otherwise be used in increasing the current in $L^4$ beyond the normal, is now transferred to the circuit C C, where it does useful work, the dynamo B delivering a correspondingly less quantity of energy. Now suppose the impedance in $L^4$ increases; The conditions are simply reversed. The immediate tendency is for the current in $L^4$ to decrease, but the disturbance of the balance in $E^5$ causes an opposing electro-motive-force in $c^2$, (which is taken care of by a rise in the electro-motive-force of the dynamo B) and an assisting electro-motive-force in $c'$, and the extra energy necessary to maintain a constant current in $L^4$ is transferred to $L^4$ from C C.

The other devices shown involve the same principle but in a somewhat more complicated manner. From the connections of the transformer $E'$, it is obvious, in the light of the explanation just given, that the current in the primary of the auxiliary transformer $T'$, will be constant, and the secondary of T, which is in circuit with $L'$, will behave exactly as though its primary were in the circuit of a constant current dynamo according to the usual practice.

$E^2$ regulates the current in the circuit $L^2$, keeping it constant as in $L^4$. $L^2$ differs from $L^4$ however in this, that it is in circuit with the secondary of an auxiliary transformer $T^2$ the primary of which is in a branch from the constant potential dynamo A, whereas $L^4$ is itself directly in the branch from A.

$E^3$ and $E^4$ are two systems like $E^2$ joined in parallel and actuated by a common auxiliary transformer $T^3$. The currents in the two branches of $L^3$ are not necessarily the same but may have any desired constant ratio.

The auxiliary transformer $T^4$ supplies a current from A which is regulated as in the foregoing examples by $E^6$. The current then divides between the two coils of the transformer Z, the two coils being connected as shown so that the currents flow at each instant in opposite directions and their magnetizing effects are opposed as in the case of $E'$, $E^2$, &c. They therefore tend to regulate each other, and the portion of the whole current which passes through each coil is inversely proportional to the number of turns in the coil.

I am aware of British Patent No. 80,040, dated June 16, 1886, and I do not claim the transformer Z, as it is the invention of Messrs. Zipernowski, Deri and Blathy, but I show it here simply to illustrate the flexibility of my system, this form of transformer being as readily adaptable to my system as the ordinary kind.

It is indispensable that the constant current and constant potential generators should run in synchronism, but it is not indispensable that they should be in antiphase, as the same result is accomplished by running them in co-phase and reversing the connections of one coil of each transformer.

The current in $L^4$ and similar circuits is not necessarily equal to that in C C, but bears any desired constant ratio thereto, the equilibrium being established by the equality of the ampère turns of the two coils. The currents in the two coils are inversely proportional to their respective turns.

Besides the devices already described there may be a series of lamps or other translating devices $L^7$ in the circuit C C, and one or more translating devices in parallel across the mains $M'$, $M^2$, up to the total capacity of the dynamos.

Having thus described my invention, I claim—

1. The method of distributing alternating electric currents herein described, consisting in passing a current of constant potential through a circuit, and maintaining the said current at a constant volume by relative inductive action between the current on said constant potential circuit and the current on a separate constant current circuit.

2. The method herein described of maintaining a constant current on a constant potential electric circuit, which consists in establishing an inductive balance between the constant potential circuit and a separate constant current circuit and altering or disturbing this balance in proportion to the change of impedance which takes place on the constant potential circuit.

3. The method herein described of maintaining a constant current on a constant potential circuit which consists in supplying current to said constant potential circuit and withdrawing current therefrom, in accordance with and in proportion to the impedance of the constant potential circuit by inductive relationship with a constant current circuit.

4. In a system of distribution for alternating electric currents, the combination of a circuit supplied from a source of constant potential, a second circuit supplied from a source of constant current, and a transformer having two coils connected respectively in said circuits, for the purpose set forth.

5. In a system of distribution for alternating electric currents, the combination of a circuit supplied from a source of constant potential, a second circuit supplied from a source of constant current, and a transformer having two coils, each of the same number of turns, connected respectively in said circuits, for the purpose set forth.

6. In a system of distribution for alternating electric currents, the combination of a circuit supplied from a source of constant potential, a second circuit supplied from a source of constant current, the phases of the two electro-motive forces being directly opposed to each other, and a transformer having two coils connected respectively in said circuits, for the purpose set forth.

In testimony whereof I subscribe my signature in presence of two witnesses.

CHARLES K. HUGUET.

Witnesses:
P. R. MIDDLEMISS,
D. S. ANDERSON.